United States Patent [19]

Tsunekawa

[11] Patent Number: 4,905,088
[45] Date of Patent: Feb. 27, 1990

[54] PICK-UP DEVICE

[75] Inventor: Tokuichi Tsunekawa, Kanagawa, Japan

[73] Assignee: Canon Kabushiki Kaisha, Tokyo, Japan

[21] Appl. No.: 333,793

[22] Filed: Apr. 4, 1989

Related U.S. Application Data

[63] Continuation of Ser. No. 248,271, Sep. 20, 1988, which is a continuation of Ser. No. 168,527, Mar. 7, 1988, which is a continuation of Ser. No. 906,584, Sep. 9, 1986, which is a continuation of Ser. No. 793,457, Oct. 28, 1985, which is a continuation of Ser. No. 442,574, Nov. 18, 1982.

[30] Foreign Application Priority Data

Nov. 25, 1981 [JP] Japan ............... 56-188917

[51] Int. Cl.⁴ .................................... H04N 3/14
[52] U.S. Cl. .................. 358/213.13; 358/213.19; 358/909; 354/174
[58] Field of Search .................. 354/374, 375; 358/213.13, 213.11, 213.19, 211, 209, 212, 227, 54, 56, 906, 909

[56] References Cited

U.S. PATENT DOCUMENTS

| | | | |
|---|---|---|---|
| 3,671,113 | 6/1972 | Johnson | 352/194 |
| 4,161,006 | 7/1979 | Cleveland | 358/225 |
| 4,172,645 | 10/1979 | Tokutomi | 354/53 |
| 4,243,308 | 1/1981 | Yamada et al. | 354/474 |
| 4,245,897 | 1/1981 | Beauviala et al. | 352/180 |
| 4,245,900 | 1/1981 | Nakamoto et al. | 354/474 |
| 4,313,657 | 2/1982 | Tokutomi et al. | 354/53 |
| 4,324,462 | 4/1982 | Tano et al. | 354/474 |
| 4,356,514 | 10/1982 | Armstrong et al. | 358/214 |
| 4,366,501 | 12/1982 | Tsunekawa et al. | 358/310 |
| 4,399,464 | 8/1983 | Hiy et al. | 358/213.13 |
| 4,420,773 | 12/1983 | Toyoda et al. | 358/335 |
| 4,439,788 | 3/1984 | Frame | 358/213 |
| 4,456,931 | 6/1984 | Toyoda et al. | 358/335 |
| 4,783,707 | 11/1988 | Nemoto et al. | 360/105 |

FOREIGN PATENT DOCUMENTS

| | | | |
|---|---|---|---|
| 52-57717 | 5/1977 | Japan | 358/228 |
| 52-257717 | 5/1977 | Japan | 358/228 |
| 0054520 | 4/1979 | Japan | 358/209 |
| 0003877 | 1/1983 | Japan | 358/209 |
| 0860102 | 9/1981 | U.S.S.R. | 358/209 |

OTHER PUBLICATIONS

British Journal of Photography, Sep. 4, 1981, p. 915, "Sony Unveils Still Video Camera".

Primary Examiner—Robert Lev
Attorney, Agent, or Firm—Toren, McGeady & Associates

[57] ABSTRACT

A photographic device typically employing a CCD element as a shutter is arranged to have an improved display system. The display system displays the picture number per unit time and the image information storage time by using different display conditions so as to avoid confusion as to what is being displayed. The device enables the photographing picture number per unit time to be taken as a multiple series of 2, such as 60, 30, 15, 8, 4, 2 1 . . . , pictures/second in order to make the numerical series of the photographing picture number common with that for the storage time of the image information so that the image information storage time and the photographing picture number per unit time can be displayed with a common display means.

26 Claims, 3 Drawing Sheets

PICK-UP DEVICE

This is a continuation application of Ser. No. 07/248,271, filed Sept. 20, 1988, which in turn is a continuation application of Ser. No. 07/168,527, filed Mar. 7, 1988, which in turn is a continuation application of Ser. No. 06/906,584, filed Sept. 9, 1986, which in turn is a continuation application of 06/793,457, filed Oct. 28, 1985, which in turn is a continuation application of Ser. No. 06/442,574, filed Nov. 18, 1982.

BACKGROUND OF THE INVENTION:

1. Field of the Invention:

The present invention relates to a display system of an image recording device.

2. Description of the Prior Art:

Along with the recent advance in IC technology the solid image pick-up device, such as the CCD, has been progressively developed and made use of with the VTR and so on.

Because this kind of solid image pick-up device can store the image information for a predetermined time, transfer the stored charge information to an analog shift register via the charge transfer means and output it time serially, it is possible to use the charge transfer means as the shutter to control the storage time, namely the stored charge amount of the image information when the brightness of the object is comparatively low.

Consequently, by repeatedly carrying out storage, reading out and recording of the image information with a predetermined timing, it is possible to carry out continuous photography in the same way as with a power winder in an ordinary camera.

Furthermore, in this case the photography frame number per unit time can optionally be set.

However, it is difficult to indicate clearly to the operator the frame number per unit time if the frame number can be changed in several steps.

For example, although it is possible to display the above frame number with a 7 segment display device in the view finder, the frame number is displayed together with other data such as storage time. Accordingly, a plural number of the display devices are needed and it is difficult and inconvenient to judge what is displayed.

It is an object of the present invention to provide an improved image pick-up device free from the above inconvenience.

It is another object of the present invention to provide a simplified display system.

It is another object of the present invention to provide a series of the continuous photographing picture number per unit time in order to attain a simplified display system.

It is a further object of the present invention to provide a simplified display system which is easy to observe, in accordance with various photographing modes.

SUMMARY OF THE INVENTION:

In order to fulfill the above objects, an embodiment of the present invention is so constructed that the photographing picture number per unit time can also be displayed with the display means for image information storage time in such a manner that the display device is remarkably simplified.

Furthermore, the embodiment is so constructed that image information storage time and the photographing picture number are displayed with different display conditions in order to avoid confusion, making it remarkably easy to observe and to judge what is displayed.

For example, by making one display with continuous lighting and the other with flickering, both can be effectively confirmed even if two kinds of displays are simultaneous.

Furthermore, in accordance with the embodiment of the present invention the photographing picture number per unit time is taken as a multiple series of 2 such as 60, 30, 15, 8, 4, 2, 1 ... pictures/second in order to make the numerical series of the photographing picture number common with that for the storage time of the image information, so that the image information storage time and the photographing picture number per unit time can be displayed with a common display means.

Figure 1:
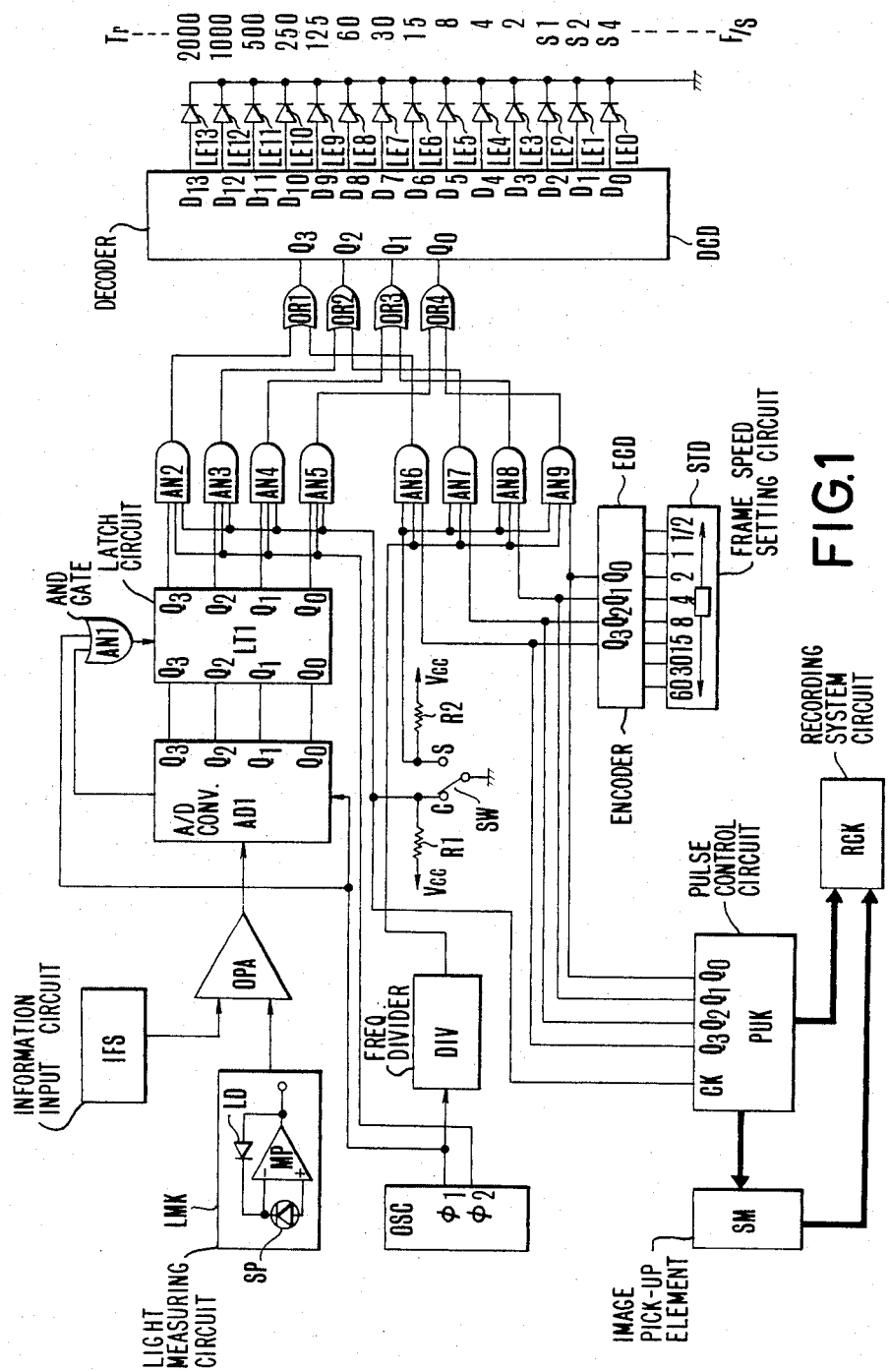
FIG. 1 shows an embodiment of the display device circuit of the present invention.
Figure 3:
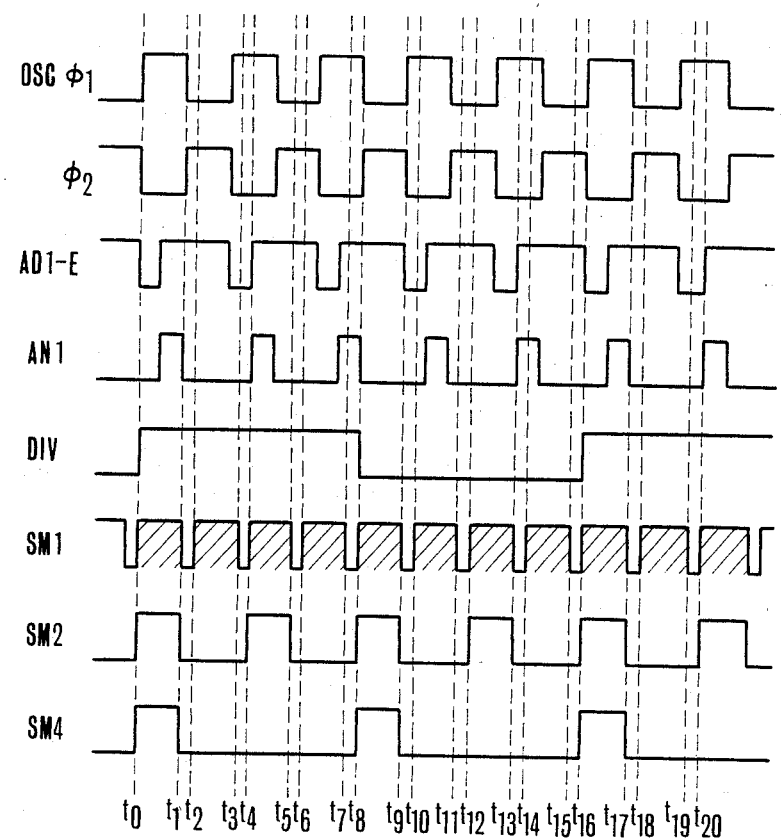
FIG. 3 is a timing chart showing the operation of the important parts shown in FIG. 1.

BRIEF DESCRIPTION OF THE PREFERRED EMBODIMENTS:

FIG. 1 shows an embodiment of the circuit of the present invention. In the drawing, the reference characters LMK identify a light measuring circuit in which the photo current produced in a photoelectric transducing element SP is logarithmically compressed by a logarithmic compressing element LD via a light measuring high input impedance operational amplifier MP, the reference characters IFS identify an information input circuit such as the diaphragm and an exposure calculating amplifier OPA calculates the light measurement information and the set information. From the output of the exposure calculating amplifier OPA the storage time information of the image is delivered to be A-D converted by an A-D converter AD1. A pulse generating circuit OSC produces timing pulses $\phi 1$ and $\phi 2$, as shown in FIG. 3. The timing pulse $\phi 1$ is applied to the S-terminal of the A-D converter AD1, which starts the A-D conversion in synchronization with the rising of the timing pulse $\phi 1$. As is shown in FIG. 3, the A-D conversion is terminated in one pulse and with the termination the output level at the E-terminal becomes high. Reference characters LT1 identify a latch circuit, having input terminals Q0, Q1, Q2, Q3 respectively connected to the output terminals Q0, Q1, Q2, Q3 of the A-D converter AD1. An AND gate AN1 applies the latch signal to the latch circuit LT1, whereby one input of the AND gate AN1 is connected to the E-terminal which delivers the A-D conversion termination pulse of the A-D converter AD1 so as to receive the output of the converter AD1 while the output level of the AN1 is high and latch it while the level is low. Furthermore, reference characters AN2–AN9 and OR1–OR4 identify AND gates and OR gates. The output terminals Q3, Q2, Q1, Q0 of the latch circuit LT1 are respectively connected to the AND gates AN2–AN5, while the output terminals Q3, Q2, Q1, Q0 of an encoder ECD are respectively connected to the AND gates AN6–AN9.

This encoder ECD encodes the number of the pictures picked up per unit time set at the pick-up frame speed setting means STD as the image number designating means.

The AND gates AN2–AN5 and gates AN6–AN9 are respectively connected to the OR gates OR1–OR4. Reference characters DCD identify a decoder, to whose input the terminals Q3, Q2, Q1, Q0 and the OR gates OR1, OR2, OR3, OR4 are respectively connected and whose output terminals D0, D1–D13 are grounded via light emitting diodes DE0, DE1–DE13. The light emitting diodes DE0, DE1–DE13 display the storage time or the pick-up frame speed during continuous photography. A photography mode change over switch SW is in the continuous photography mode at the side of C and in the single photography mode at the side of S, being applied with the voltage Vcc respectively via the resistances, R1, R2.

A frequency divider DIV divides the frequency of the output $\phi 1$ of the pulse generating circuit OSC for making light emitting elements LE0–LE13 flicker via the AND gates AN6–AN9 in the continuous photography mode to display clearly the pick-up frame speed and the shutter time differently.

Reference characters SM identify a solid image pick-up element, reference characters PUK identify a pulse control circuit and reference characters RCK identify a conventional recording system circuit, whereby they constitute the image recording device. The terminals Q0, Q1, Q2, Q3 of the PULSE CONTROL CIRCUIT PUK are respectively connected to the terminals Q0, Q1, Q2, Q3 of the encoder ECD, whereby when the mode change over switch SW is set at the side of C, a low level signal is applied to the CK terminal of the pulse control circuit PUK so that the control pulse for photographing at the frequency on the basis of the pick-up frame speed set at the pick-up frame speed setting means STD is respectively produced and delivered to the recording system circuit RCK.

Figure 2:
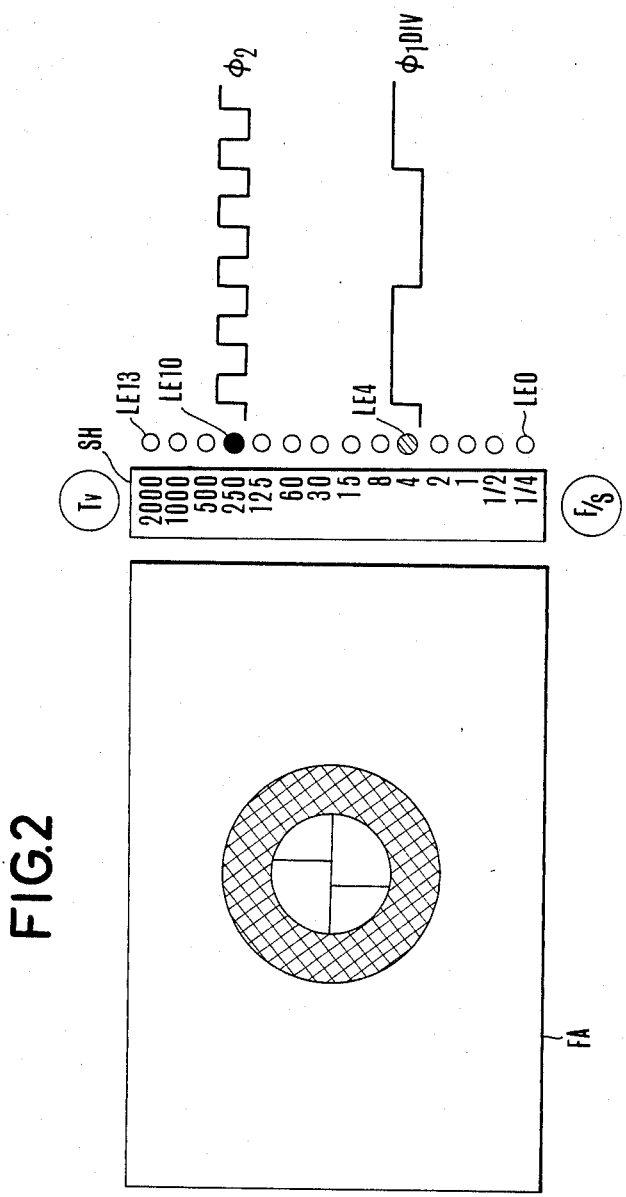
FIG. 2 shows an example of a display.

FIG. 2 shows an embodiment of the display in the view finder of the image pick-up device.

Reference characters SH identify a scale plate, on which the multiple series of 2 for example 2000 ($\approx 2^{11}$), 1000 ($\approx 2^{10}$), 500 ($\approx 2^9$), 250 ($\approx 2^8$), 125 ($\approx 2^7$), 60 ($\approx 2^6$), 30 ($\approx 2^5$), 15 ($\approx 2^4$), 8 ($\approx 2^3$), 4 ($\approx w^2$), 2 ($\approx 2^1$), 1 ($\approx 2^0$), ½ ($\approx 2^{-1}$), ¼ ($\approx 2^{-2}$) are scaled. They are considered as frame speed (F/S), while their reciprocal numbers correspond to storage time (TV).

Hereby, even if the storage time TV is not considered as the reciprocal numbers of the scale values, it is possible to make the values correspond to the scale value when for example 2000–1/2000 are scaled. However, this means too many scale values, which is inconvenient. In accordance with the present invention the scale values are $2^n$ (n: positive or negative integer), so that a symmetry is constituted with reference to 1 eliminating part of the scale. This effect can be obtained not only from $2^n$ but also from $m^n$ (m: constant).

As described above, in accordance with the present invention the series of values of the storage time TV are common with that of the value of the frame speed F/S so that the display can be remarkably simple.

Reference characters FA identify a view finder. For example, when the photography mode change over switch SW is set in the single photography mode at the side of S, the output of the exposure calculating circuit OPA delivers the storage time TV of 1/250 sec., the AND gates AN2–AN5 open, while AN6–AN9 close so that the light emitting element LE10 flickers in synchronization with $\phi 2$ and the storage time TV is displayed, as shown in FIG. 2.

On the other hand, when the photography mode change over switch SW is set in the continuous photography mode at the side of C, the AND gates AN6–AN9 open, while AN2–AN5 close so that the storage time TV disappears, whereby the light emitting element LE4 flickers at a frequency, for example, ¼ as high as that of the clock $\phi 1$ displaying the pick-up frame speed set at the pick-up frame speed F/S setting means STD, for example, 4 frames per second, as shown in FIG. 2.

FIG. 3 is a timing chart of the important part of the circuit shown in FIG. 1. The image information stored during the time between t0–t1, in the solid image pick-up device SM is transferred to the analog shift register via a conventional change transfer means during the time between t1–t2, and time is serially read out and recorded during the time between t2–t3, while new image information is stored.

Then, the picture information stored in the solid image pick-up device SM during the time between t2–t3 is transferred to the analog shift register via the charge transfer means during the time between t3–t4 and the time is serially read out and recorded, while new image information is stored. Thus, the above operation is repeated.

Display SM1 shows that 60 frames of the information are recorded per second, a display SM2 shows that 30 frames are recorded per second and a display SM3 shows that 15 frames are recorded per second.

Furthermore, although in continuous photography of the present embodiment the storage time is not displayed, it is possible to display both the storage time TV and the frame speed F/S. Because the flickering frequency of the shutter time is different from that of the photographing frame speed F/S, it is possible to tell one from the other.

Furthermore, it goes without saying that either one can be displayed with flickering.

As described above, in accordance with the present invention the photographing frame speed F/S at the time of continuous photography can be characteristically displayed easily and rationally in the view finder.

Hereby, it goes without saying that the storage time TV can be manually set.

Furthermore, because in accordance with the present invention the storage time TV is selected from the numerical series of $2^n$, it is suited for the APEX calculation and the calculating circuit can be constituted easily.

What I claim:

1. An image pick-up device comprising:
   (a) image pick-up means for converting an optical picture information into an electrical signal; and
   (b) picture number designating means for selectively designating a number of picture pick-ups per unit time in the image pick-up means out of a plural number of set values, whereby the plural number of set values is in the relation satisfying about $2^n$, (n: an integer).

2. An image pick-up device, comprising:
   (a) image pick-up means for converting an optical picture information into an electrical signal;
   (b) image pick-up period designating means for selectively designating the image pick-up period of the optical picture information in the image pick-up means out of a plural number of set values;
   (c) picture number designating means for selectively designating a number of picture pick-ups per unit time in the image pick-up means out of a plural number of set values; and (d) control means for controlling a pick-up period in the image pick-up means in response to an output of said image pick-up period designating means, whereby the plural number of set values concerning the image pick-up period and that concerning the picture number are both included in a numerical series of about $m^n$ (m: a predetermined common constant value, n: an integer).

3. An image pick-up device according to claim 2, wherein the set value designated by the image pick-up period time designating means and that designated by the picture number designating means are indicated in a same display device.

4. An image pick-up device according to claim 3, wherein the display device has a scale and means for showing a predetermined position on the scale.

5. An image pick-up device according to claim 2, wherein m=2.

6. A picture pick-up device, comprising:
(a) image pick-up means for storing an optical picture information;
(b) image pick-up period designating means for selectively designating an image pick-up period of the optical picture information out of a plural number of set values;
(c) a picture number designating means for selectively designating a number of picture pick-ups per unit time in the image pick-up means out of a plural number of set values; and
(d) control means for controlling a pick-up period in the image pick-up means in response to an output of said image pick-up period designating means, whereby the plural number of set values concerning the picture number are involved in the plural number of set values concerning the image pick-up period or the reciprocals thereof.

7. An image pick-up device according to claim 6, wherein the plural number of set values concerning the picture number and that of the image pick-up period are both in the numerical series of $m^n$ (m: a common constant value, n: an integer).

8. An image pick-up device according to claim 1, wherein said picture number designating means is arranged to selectively designate one of at least three set values.

9. An image pick-up device according to claim 1, wherein the set values selectively designated by said picture number designating means include at least 1, 2, 4 and 8.

10. An image pick-up device according to claim 1, and further comprising an image pick-up period designating means for selectively designating the image pick-up period of the optical picture information in the image pick-up means out of a plural number of set values.

11. An image pick-up device according to claim 10, wherein at least three values of the set values of said image pick-up period designating means and the set values of said picture number designating means are the same or reciprocal numbers of each other.

12. An image pick-up device according to claim 2, wherein said picture number designating means is arranged to selectively designate one of at least three set values.

13. An image pick-up device according to claim 2, wherein the set values selectively designated by said picture number designating means include at least 1, 2, 4 and 8.

14. An image pick-up device according to claim 2, wherein at least three values of the set values of said image pick-up period designating means and the set values of said picture number designating means are the same or reciprocal numbers of each other.

15. An image pick-up device according to claim 6, wherein said picture number designating means is arranged to selectively designate one of at least three set values.

16. An image pick-up device according to claim 6, wherein the set values selectively designated by said picture number designating means include at least 1, 2, 4 and 8.

17. An image pick-up device according to claim 6, wherein at least three values of the set values of said image pick-up period designating means and the set values of said picture number designating means are the same or reciprocal numbers of each other.

18. An image pick-up device comprising:
image pick-up means for converting an optical picture information into an electrical signal;
record means for recording said electrical signal; and
picture number designating means for selectively designating numbers of pictures recorded per unit time out of a plural number of set values, whereby the plural number of set values is in the relation satisfying about $2^n$, (n: an integer).

19. An image pick-up device according to claim 18, wherein said picture number designating means is arranged to selectively designate at least three set values.

20. An image pick-up device according to claim 18, wherein the set values selectively designated by said picture number designating means include at least 1, 2, 4 and 8.

21. An image pick-up device according to claim 18, and further comprising image pick-up period designating means for selectively designating the image pick-up period of the optical picture information in the image pick-up means out of a plural number of set values.

22. An image pick-up device according to claim 21, wherein at least three values of the set values of said image pick-up period designating means and the set values of said picture number designating means are equal or reciprocal numbers of each other.

23. An image pick-up device according to claim 1, wherein the set values selectively designated by said picture number designating means include at least 1, 2, 4, 8 and 15.

24. An image pick-up device according to claim 2, wherein the set values selectively designated by said picture number designating means include at least 1, 2, 4, 8 and 15.

25. An image pick-up device according to claim 6, wherein the set values selectively designated by said picture number designating means include at least 1, 2, 4, 8 and 15.

26. An image pick-up device according to claim 18, wherein the set values selectively designated by said picture number designating means include at least 1, 2, 4, 8 and 15.

* * * * *